United States Patent
Ono et al.

(10) Patent No.: US 10,612,776 B2
(45) Date of Patent: Apr. 7, 2020

(54) COMBUSTION APPARATUS

(71) Applicant: RINNAI CORPORATION, Aichi (JP)

(72) Inventors: Takahiro Ono, Nagoya (JP); Takashi Ojiro, Nagoya (JP); Hideo Okamoto, Nagoya (JP)

(73) Assignee: RINNAI CORPORATION, Aichi (JP)

( * ) Notice: Subject to any disclaimer, the term of this patent is extended or adjusted under 35 U.S.C. 154(b) by 182 days.

(21) Appl. No.: 16/063,375

(22) PCT Filed: Oct. 3, 2016

(86) PCT No.: PCT/JP2016/004448
§ 371 (c)(1),
(2) Date: Jun. 18, 2018

(87) PCT Pub. No.: WO2017/110019
PCT Pub. Date: Jun. 29, 2017

(65) Prior Publication Data
US 2018/0372311 A1 Dec. 27, 2018

(30) Foreign Application Priority Data
Dec. 22, 2015 (JP) ................... 2015-250450

(51) Int. Cl.
*F23D 14/78* (2006.01)
*F24H 9/14* (2006.01)
(Continued)

(52) U.S. Cl.
CPC ............. *F23D 14/78* (2013.01); *F23D 14/02* (2013.01); *F23D 14/14* (2013.01); *F23D 14/145* (2013.01);
(Continued)

(58) Field of Classification Search
CPC ........ F23D 14/145; F23D 14/78; F23D 14/14; F23D 14/02; F23D 14/36;
(Continued)

(56) References Cited

FOREIGN PATENT DOCUMENTS

| EP | 2811141 A1 | 12/2014 |
| JP | 62-168757 U | 11/1988 |

(Continued)

OTHER PUBLICATIONS

International Search Report and Written Opinion for PCT Patent App. No. PCT/JP2016/004448 (dated Dec. 13, 2016) with English translation of the ISR.

*Primary Examiner* — Alfred Basichas
(74) *Attorney, Agent, or Firm* — Cermak Nakajima & McGowan LLP; Tomoko Nakajima (57) ABSTRACT

In a combustion apparatus including: a burner made up of a burner body and a sheet-metal combustion plate; and a combustion box which has a connection flange part to be coupled to a body flange part in a circumference of the burner body, the combustion box has disposed therein water passages as a cooling means, and a thermal insulation material which overlaps that portion of the combustion plate flange part which faces an inner space of the combustion box. A fixing plate for the thermal insulation material is attached to the combustion plate flange part. The fixing plate is provided with pressing claws for pressing in position the thermal insulation material so as to press and prevent the thermal insulation material from getting released away from the fixing plate. And water passages are disposed in a manner to contact the pressing claws.

2 Claims, 7 Drawing Sheets (51) Int. Cl.
- *F23D 14/14* (2006.01)
- *F23D 14/36* (2006.01)
- *F23D 14/02* (2006.01)
- *F24H 1/40* (2006.01)
- *F24H 9/02* (2006.01)
- *F24H 1/00* (2006.01)

(52) U.S. Cl.
CPC ............... *F23D 14/36* (2013.01); *F24H 1/40* (2013.01); *F24H 9/02* (2013.01); *F24H 9/148* (2013.01); *F23D 2900/14001* (2013.01); *F24H 1/0027* (2013.01); *Y02E 20/366* (2013.01)

(58) Field of Classification Search
CPC .. F23D 2900/14001; F24H 9/02; F24H 9/148; F24H 1/40; F24H 1/0027; Y02E 20/366
See application file for complete search history.

(56) References Cited

FOREIGN PATENT DOCUMENTS

| | | |
|---|---|---|
| JP | 9-280549 A | 10/1997 |
| JP | 2008-075901 A | 4/2008 |
| JP | 2011-196556 A | 10/2011 |

COMBUSTION APPARATUS

This application is a national phase entry under 35 U.S.C. § 371 of PCT Patent Application No. PCT/JP2016/00448, filed on Oct. 3, 2016, which claims priority under 35 U.S.C. § 119 to Japanese Patent Application No. 2015-250450, filed Dec. 22, 2015, both of which are incorporated by reference.

TECHNICAL FIELD

The present invention relates to a combustion apparatus comprising: a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body, and which contains therein a heat exchanger

BACKGROUND ART

As this kind of combustion apparatus, there is known an apparatus in patent document 1 in which, in order to improve the heat resistivity of the combustion box, water passages as a cooling means for cooling the combustion box are installed in series with the heat exchanger in that portion of the combustion box which lies between the burner and the heat exchanger. Further, in this arrangement, by interposing a packing between a combustion plate flange part on a circumference of the combustion plate and the body flange part, the sealing performance between the combustion plate flange part and the body flange part is secured.

By the way, at the time of combustion by the burner, that portion of the combustion plate flange part which faces an inner space of the combustion box will receive a considerable amount of calorific value. And when overheating of the combustion plate flange part takes place, the temperature of the burner body will reach a considerably high temperature due to transmission of heat from the combustion plate flange part. As a result, accessories of the burner body, e.g., a check valve to be disposed at a flow inlet of the burner body will be subjected to a bad effect due to heat.

Figure 7:
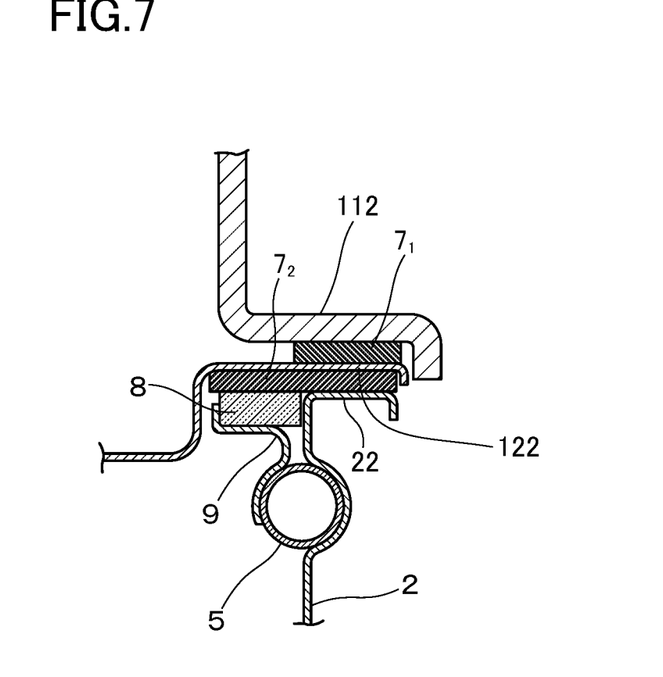
FIG. 7 is an enlarged sectional view of an essential portion of the conventional example.

Then, although not described in patent document 1, there is also conventionally known one, as shown in FIG. 7, having disposed a thermal insulation material 8 overlapping that portion of the combustion plate flange part 122 which faces the inner space of the combustion box 2. It is thus so arranged that overheating of the combustion plate flange part 122 can be prevented. In this arrangement, a fixing plate 9 for the thermal insulation material is attached to the water passages 5 disposed in that portion of the combustion box 2 which lies between the burner and the heat exchanger. By the way, in the arrangement shown in FIG. 7, there is interposed a first packing $7_1$ between the body flange part 112 and the combustion plate flange part 122, and a second packing $7_2$ is interposed between the combustion plate flange part 122 and the connection flange part 22. Then, in that portion of the combustion plate flange part 122 which faces the inner space of the combustion box 2, the thermal insulation material 8 is overlapped in a state in which the second packing $7_2$ is sandwiched.

It is for the purpose of preventing the overheating of the fixing plate 9 that the fixing plate 9 for the thermal insulation material is attached to the water passages 5. However, since the water passages 5 are hollow, the fixing plate 9 will have to be attached to the water passages 5 not by spot welding but by a troublesome work of brazing. As a result, the cost for attaching the fixing plate 9 becomes expensive. Further, the thermal insulation material 8 will then be fixed to the combustion box 2 through the fixing plate 9 and the water passages 5. Therefore, when the burner has been assembled to the combustion box 2, positional deviation of the thermal insulation material relative to the combustion plate flange part 122 is likely to occur, thereby giving rise to fluctuation in the thermal insulation effect.

PRIOR ART DOCUMENT

Patent Documents

Patent Document 1: Specification of EP-A-2811141

SUMMARY OF THE INVENTION

Problems that the Invention is to Solve

In view of the above-mentioned points, this invention has a problem of providing a combustion apparatus in which the positional accuracy of the thermal insulation material relative to the combustion plate flange part and the durability of the fixing plate for the thermal insulation material are secured, and also in which the cost for attaching the fixing plate can be reduced.

Means for Solving the Problems

In order to solve the above-mentioned problems, this invention is a combustion apparatus comprising: a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body and which contains therein a heat exchanger. In that portion of the combustion box which lies between the burner and the heat exchanger, water passages in series connection with the heat exchanger are disposed as a cooling means for cooling the combustion box. A packing is further interposed between a combustion plate flange part on a circumference of the combustion plate and the body flange part. There is disposed a thermal insulation material overlapping that portion of the combustion plate flange part which faces an inner space of the combustion box. The combustion apparatus is characterized in: that a fixing plate for the thermal insulation material is attached to the combustion plate flange part; that the fixing plate is provided with pressing claws for pressing in position the thermal insulation material so as to press and prevent the thermal insulation material from getting released away from the fixing plate; and that the water passages are disposed into contact with the pressing claws.

According to this invention, since the fixing plate for the thermal insulation material is attached to the combustion plate flange part, the positional accuracy of the thermal insulation material relative to the combustion plate flange part can be secured. Therefore, the thermal insulation effect at the combustion plate flange part can surely be obtained. In addition, unlike the conventional example in which the fixing plate is attached to the hollow water passages, the attaching of the fixing plate in this invention can be performed by an extremely convenient way of spot welding as compared with brazing. Accordingly, the cost for attaching the fixing plate can be reduced. In addition, since the fixing plate is covered with the thermal insulation material, the fixing plate can be prevented from getting overheated, thereby securing durability of the fixing plate. Further, although the pressing claws are not covered by the thermal insulation material, the water passages are in contact with the pressing claws. Therefore, due to the heat dissipation to the water passages, the pressing claws can also be prevented from getting overheated.

Furthermore, in this invention, preferably those outside surfaces of the water passages which are on a side of the pressing claws have flat surface parts, and the flat surface parts are in surface-contact with the pressing claws. According to this arrangement, efficient heat dissipation takes place from the pressing claws to the water passages. The overheating of the pressing claws can surely be prevented.

BRIEF DESCRIPTION OF THE DRAWINGS

FIG. 5($a$) is an enlarged sectional view of an essential portion of the combustion apparatus of the embodiment, and 5($b$) is an enlarged sectional view of another essential portion of the combustion apparatus.

FIG. 6($a$) is a perspective view of the combustion apparatus of the embodiment, in a state in which a thermal insulation material for the combustion plate has been fixed, and 6($b$) is a perspective view thereof in a state in which the thermal insulation materials for the combustion plate have been shown in a separated state.

EMBODIMENTS FOR CARRYING OUT THE INVENTION

With reference to FIGS. 1 to 4, a combustion apparatus according to an embodiment of this invention is provided with: a burner 1 made up of a burner body 11 which is supplied inside thereof with air-fuel mixture (mixture gas of fuel gas and primary air), and a sheet-metal combustion plate 12 which covers a downward open surface 111 of the burner body 11; and a combustion box 2 which has, at an upper end, a connection flange part 22 to be coupled, with machine screws 21, to a body flange part 112 which encloses the open surface 111 of the burner body 11. The combustion box 2 contains, inside thereof, a heat exchanger 3 for supplying hot water.

The burner body 11 has opened therein an inlet port 113 to which is connected a fan 4 for supplying air-fuel mixture. The inlet port 113 has mounted therein a check valve 13 which prevents, at the time of the fan 4 stopping, the air-fuel mixture staying inside the burner body 11 from flowing back toward the fan 4. The check valve 13 is constituted by: a resin valve box 131 to be fitted into the inlet port 113; and a resin valve plate 132 mounted in that opening of the valve box 131 which faces inside the burner body 11 so as to be swingable about an axis between opened and closed postures.

The combustion plate 12 has a large opening in the center thereof. This opening has mounted therein a canvass 121$a$ made of heat-resistant fiber and mounted thereon, in a manner overlapping each other, a distribution plate 121$b$ which has formed therein a multiplicity of distribution holes. An ejection part 121 for the air-fuel mixture is thus constituted by the canvass 121$a$ and the distribution plate 121$b$. The air-fuel mixture supplied by the fan 4 into the burner body 11 is ejected out of the air-fuel ejection part 121 to thereby perform totally primary air combustion. By the way, it is also possible to form a multiplicity of burner ports in the combustion plate having no large opening so that these burner ports constitute the air-fuel mixture ejection part.

The heat exchanger 3 is constituted by a fin-tube type of heat exchanger having; a multiplicity of fins 31; and a plurality of heat absorbing tubes 32 which penetrate through these fins 31. On outside surfaces of side plates 23, 24 on laterally one side and on laterally the opposite side of the combustion box 2, there are mounted a plurality of connection covers 33 which define, together with each of the side plates 23, 24, connection passages for the adjoining two heat absorbing tubes 32, 32. By means of these connection passages, all of the heat absorbing tubes 32 are connected in series with each other. In addition, a water inlet port 34 is disposed in the connection covers 33 which define, between the laterally opposite-side side plate 24, a connection passage to be connected to an upstream-end heat-absorbing tube 32.

Figure 1:
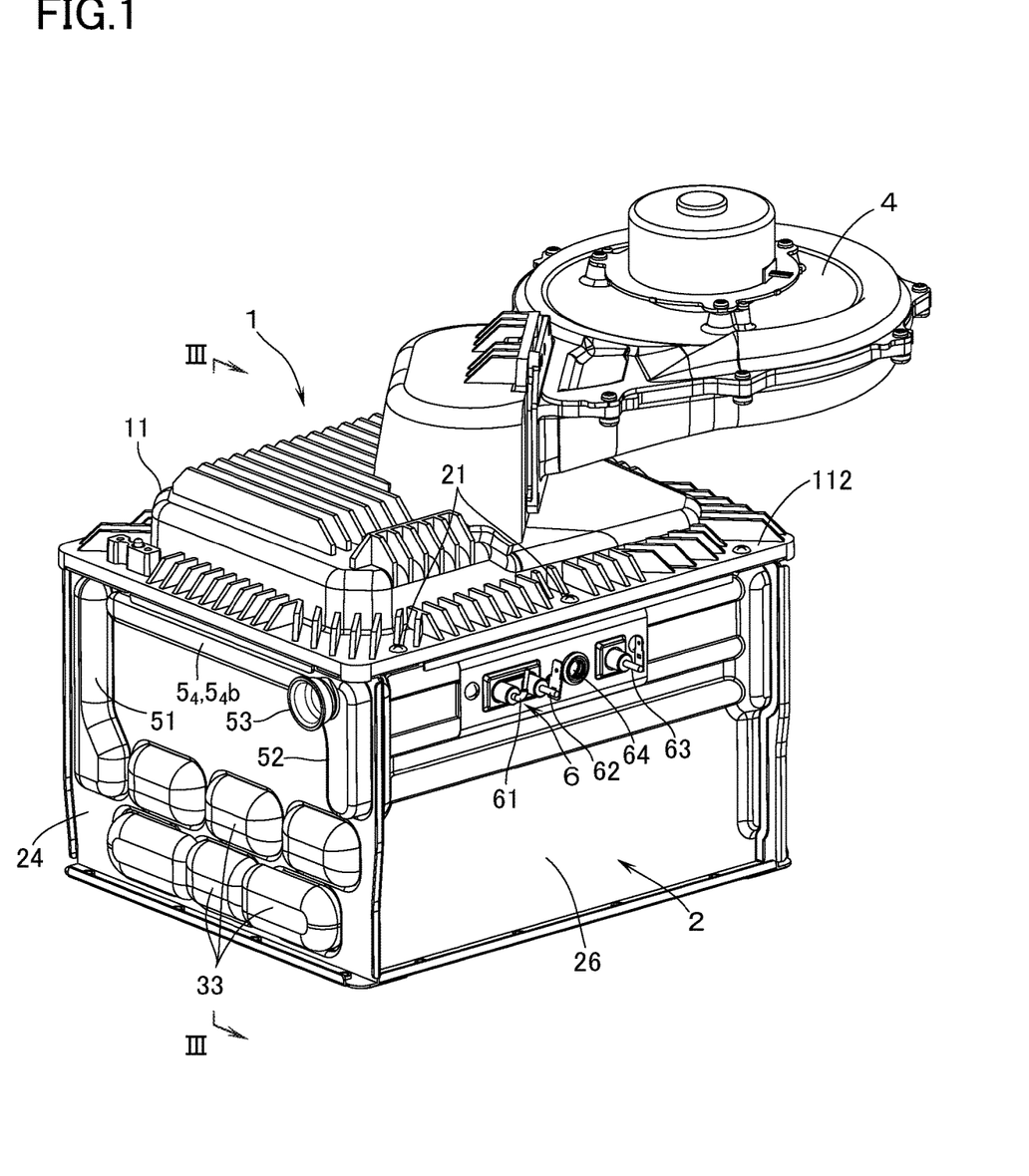
FIG. 1 is a perspective view of a combustion apparatus of an embodiment of this invention.
Figure 2:
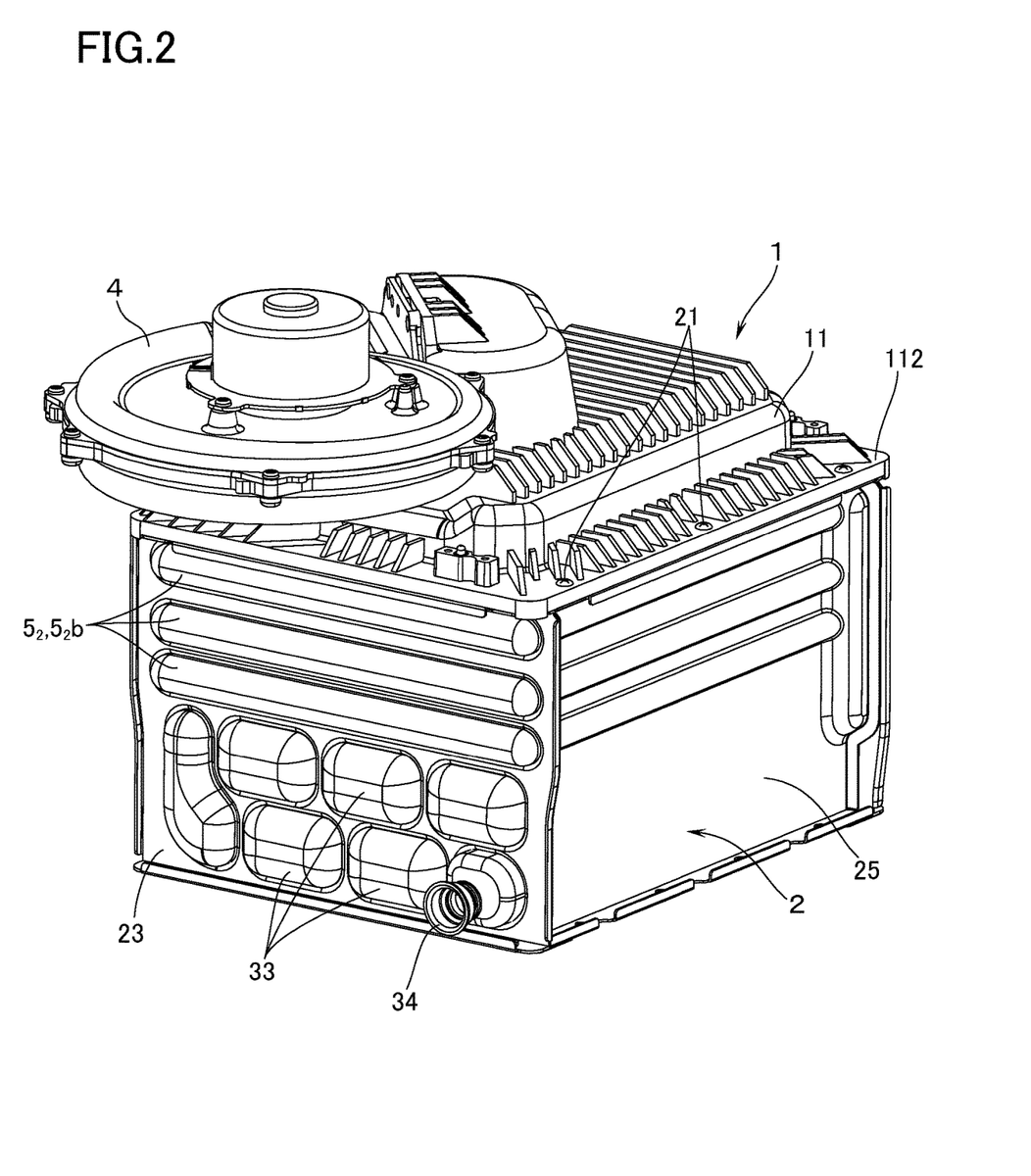
FIG. 2 is a perspective view of the combustion apparatus of the embodiment as viewed from a side opposite to that in FIG. 1.
Figure 3:
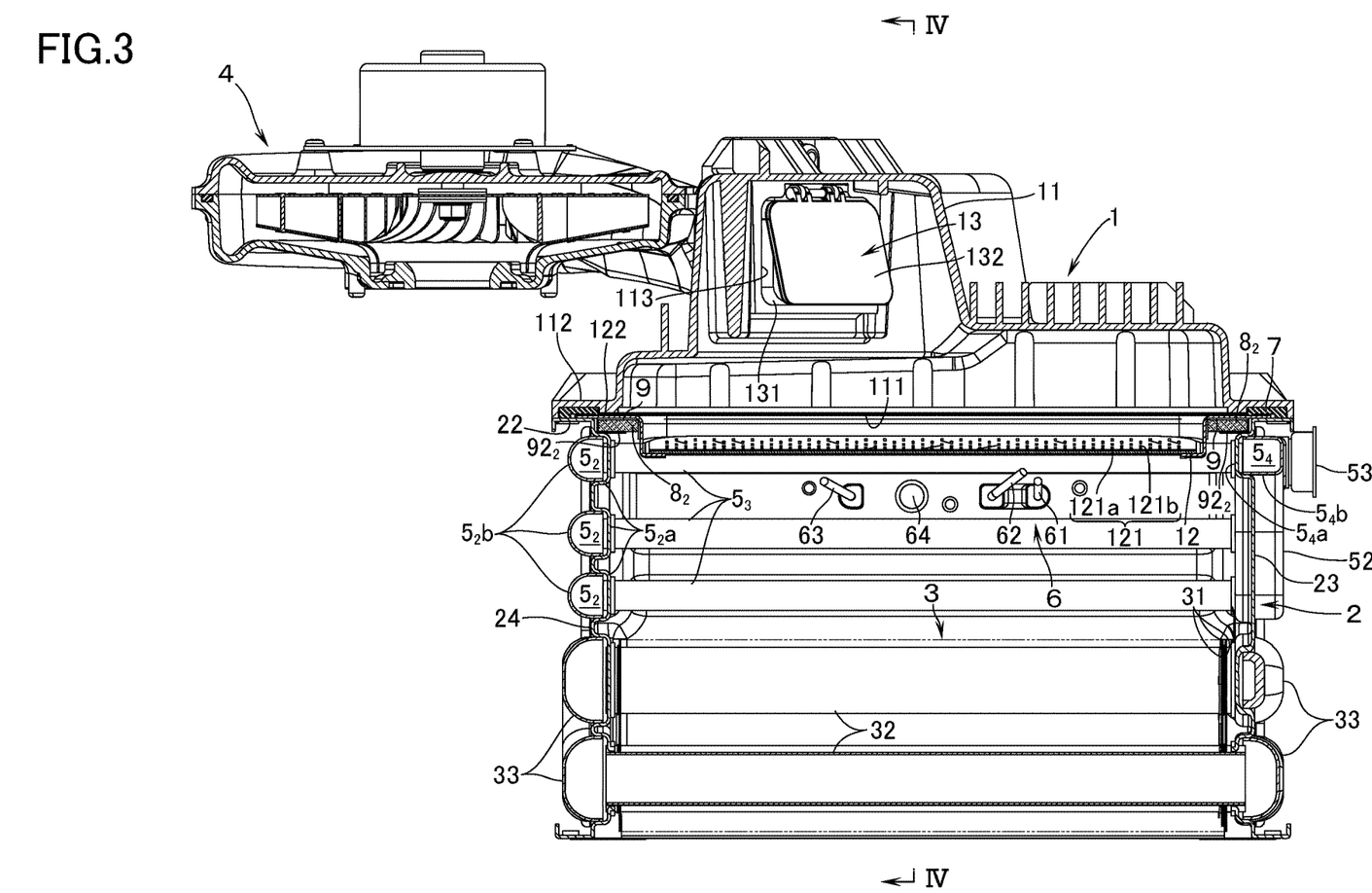
FIG. 3 is a sectional view cut away along the line III-III in FIG. 1.
Figure 4:
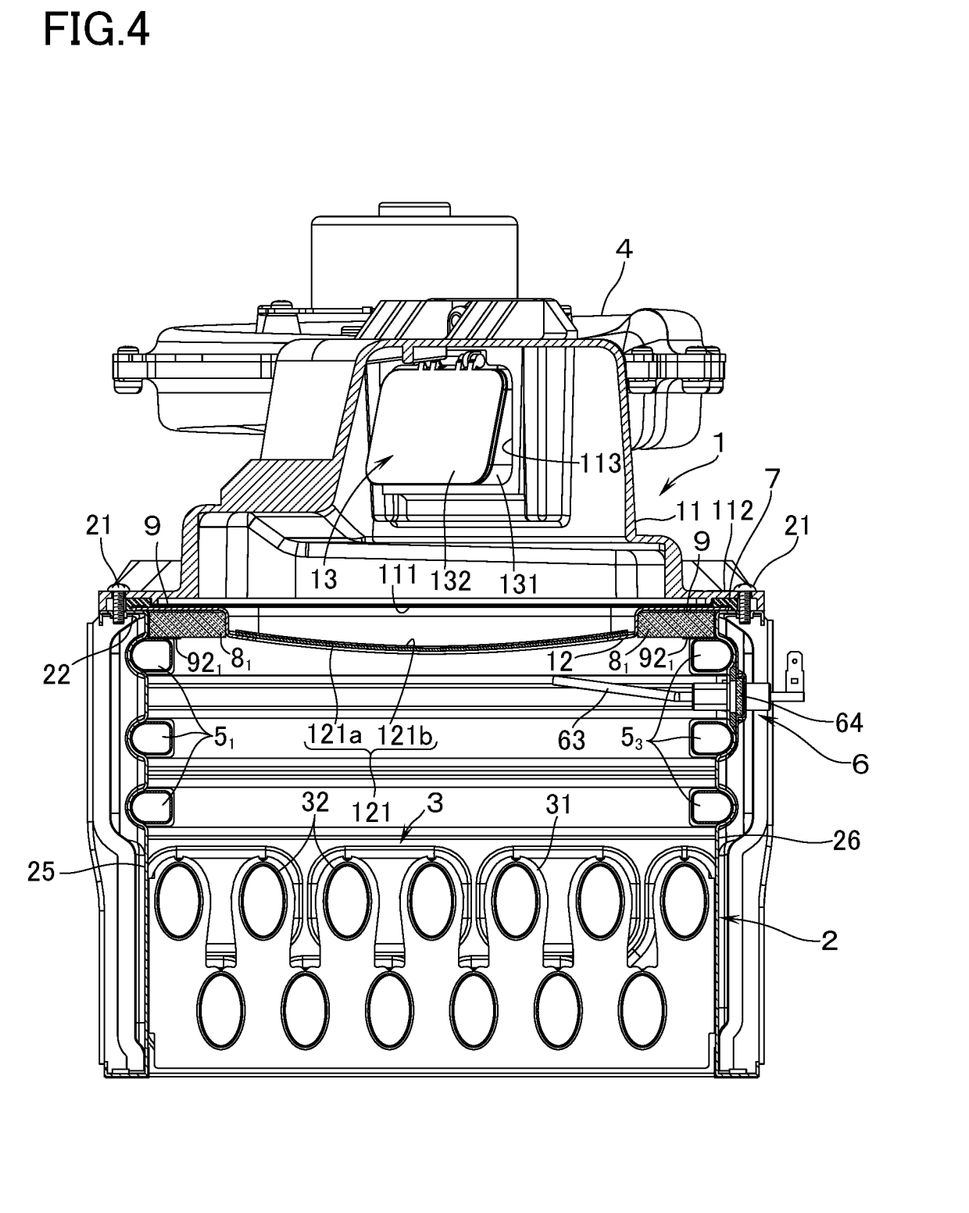
FIG. 4 is a sectional view cut away along the line IV-IV in FIG. 3.

Further, in that portion of the combustion box 2 which lies between the burner 1 and the heat exchanger 3, there are disposed, as a cooling means for cooling the combustion box 2, water passages which are connected in series with the heat exchanger 3. In more specific description, on an inside of that portion of the rear-side side plate 25 of the combustion box 2 which lies above the heat exchanger 3, there are vertically arranged three pieces of first water passages $5_1$, made up of tubes, in a manner to be in contact with the side plate 25. Also on an inside of that portion of the front-side side plate 26 of the combustion box 2 which is above the heat exchanger 3, there are vertically arranged three pieces of third water passages $5_3$, made up of tubes, in a manner to be in contact with the side plate 26. Further, on an outside surface of the side plate 24 on the laterally opposite side of the combustion box 2, there are mounted: an inlet-side header cover 51 which defines, together with the side plate 24, a connection passage between the vertically arranged three pieces of first water passages $5_1$ and the downstream-end heat absorbing tube 32 of the heat exchanger 3; and an outlet-side header cover 52 which defines, together with the side plate 24, a connection passage for the vertically arranged three pieces of third water passages $5_3$. The outlet-side header cover 52 is provided with a hot water outlet port 53. Further, the laterally one-side side plate 23 of the combustion box 2 is provided, as shown in FIG. 2 and FIG. 3, with vertically arranged three pieces of second water passages $5_2$ which connect together the three pieces of rear-side vertically arranged first water passages $5_1$ and the three pieces of front-side vertically arranged third water passages $5_3$. Each of the second water passages $5_2$ is constituted by laterally inward dents $5_2a$ formed in the side plate 23, and a cover $5_2b$ mounted on the outside surface of the side plate 23 so as to cover the dents $5_2a$. Then, water supplied from the water inlet port 34 is heated by the heat exchanger 3, and the heated water is flowed out from the hot water outlet port 53 through the connection passage inside the inlet-side header cover 51, the first water passages $5_1$, the second water passages $5_2$, the third water passages $5_3$, and the connection passage inside the outlet-side header cover 52. Further, the laterally opposite-side side plate 24 of the combustion box 2 is provided with a fourth water passage $5_4$ which is extended rearward from an upper part of the connection passage inside the outlet-side header cover 52 and which is constituted by a laterally inward dent $5_{4a}$ formed in the side plate 24, and a cover $5_{4b}$ integral with the outlet-side header cover 52 which covers the dent $5_{4a}$. Then, by means of the water to flow through the first through the fourth water passages $5_1$~$5_4$, each of the side plates 23~26 is arranged to be cooled.

The front-side side plate 26 of the combustion box 2 has mounted thereon an electrode component 6 having an ignition electrode 61, a ground electrode 62, and a flame rod 63, all penetrating the side plate portions between the No. 1 and the No. 2, i.e., totally two, third water passages $5_3$, $5_3$ counted from the top to thereby protrude into the combustion box 2. By the way, the electrode component 6 is additionally provided with an inspection window 64 which enables visual confirmation inside the combustion box 2.

Figure 5A:
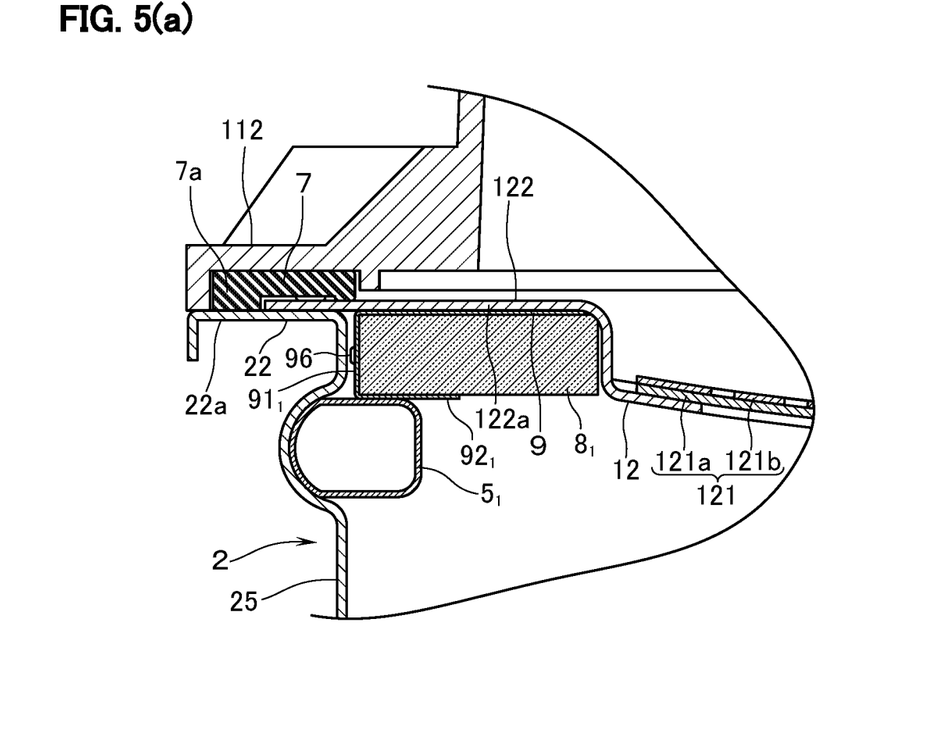
Figure 5B:
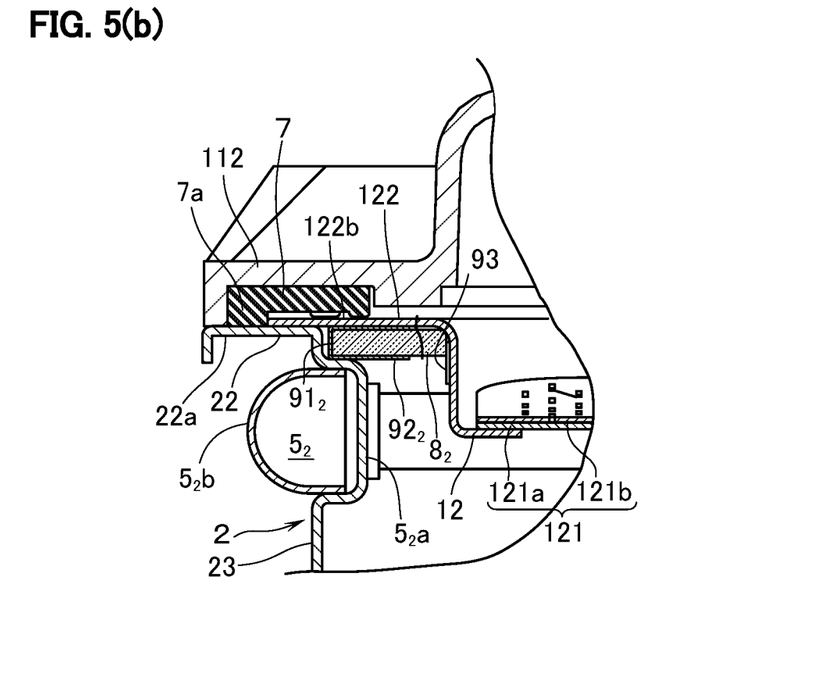

As clearly shown in FIG. 5, in the circumference of the combustion plate 12, there is disposed a combustion plate flange part 122 which is offset upward relative to the air-fuel mixture ejection part 121. Between this combustion plate flange part 122 and the body flange part 112, there is interposed a packing 7 to secure sealing property between the combustion plate flange part 122 and the body flange part 112. The outer circumference of the combustion plate flange part 122 is positioned on the inner side of the outer circumference of the body flange part 112. Further, the connection flange part 22 has a protruded part 22a which protrudes outward beyond the outer circumference of the combustion plate flange part 122. The packing 7 also has a protruded part 7a which protrudes outward beyond the outer circumference of the combustion plate flange part 122. Then, the protruded part 7a of the packing 7 is interposed between the protruded part 22a of the connection flange part 22 and the body flange part 112 to secure sealing property between the connection flange part 22 and the body flange part 112. Further, the inner circumference of the connection flange part 22 is positioned in a midpoint between the inner circumference and the outer circumference of the combustion plate flange part 122. The connection flange part 22 is thus arranged to be in direct contact with that portion of the combustion plate flange part 122 which is outside the inner circumference of the connection flange part 22.

By the way, at the time of weak combustion at which the amount of air-fuel mixture inside the burner body 11 is small, the cooling function by the air-fuel mixture is reduced and, therefore, the heat is likely to be accumulated in the burner body 11. Further, the sheet-metal combustion plate 12 will rise to a considerably high temperature. As a result, when the heat of the combustion plate 12 is transmitted to the burner body 11, the burner body 11 will rise to a considerably high temperature. As a consequence, the check valve 13, which is an auxiliary part of the burner body 11, will be subjected to a bad effect due to heat. As in this embodiment, if the connection flange part 22 is arranged to be in direct contact with the combustion plate flange part 122, the cold by the water passages $5_1$~$5_4$ be transmitted to the combustion plate flange part 22 through the connection flange part 22. The heat transmission from the combustion plate 12 to the burner body 11 can be restrained to a certain degree. But if the amount of heat input into that portion of the combustion plate flange part 122 which is positioned on the inner side of the connection flange part 22, i.e., into that portion of the connection plate flange part 122 which faces the inner space of the combustion box 2 becomes larger, the temperature rise of the burner body 11 cannot be sufficiently restrained due to overheating of the combustion plate flange part 122.

Then, in this embodiment, there is disposed a thermal insulation material overlapping that portion of the combustion plate flange part 122 which faces an inner space of the combustion box 2. In this manner, the combustion plate flange part 122 is prevented from getting overheated. A description will now be made of this point with reference to FIGS. 5 and 6.

Figure 6A:
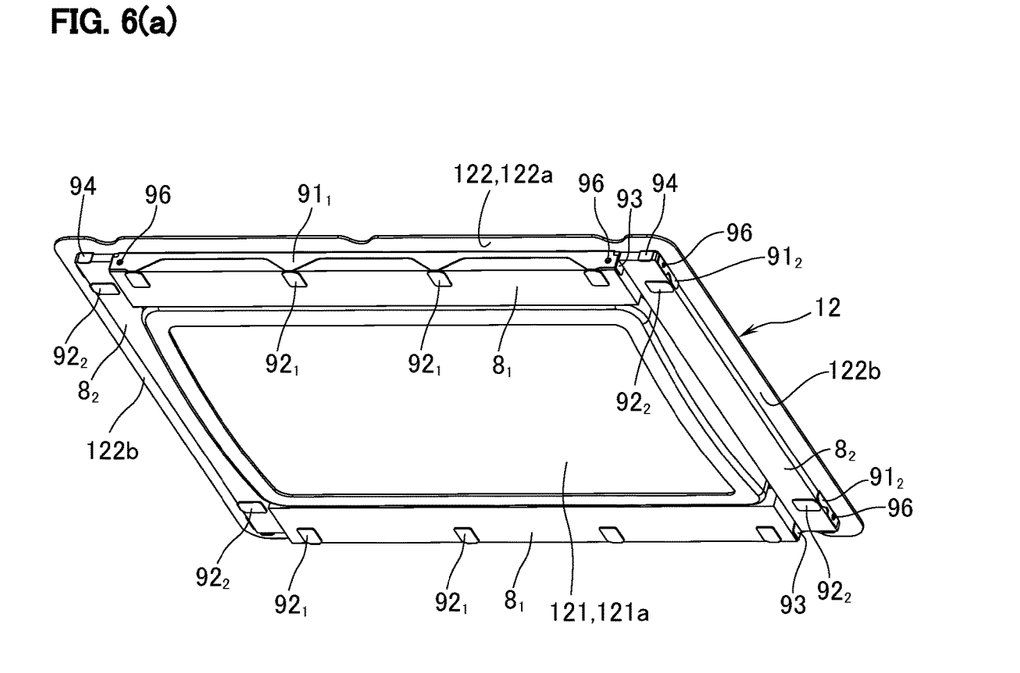
Figure 6B:
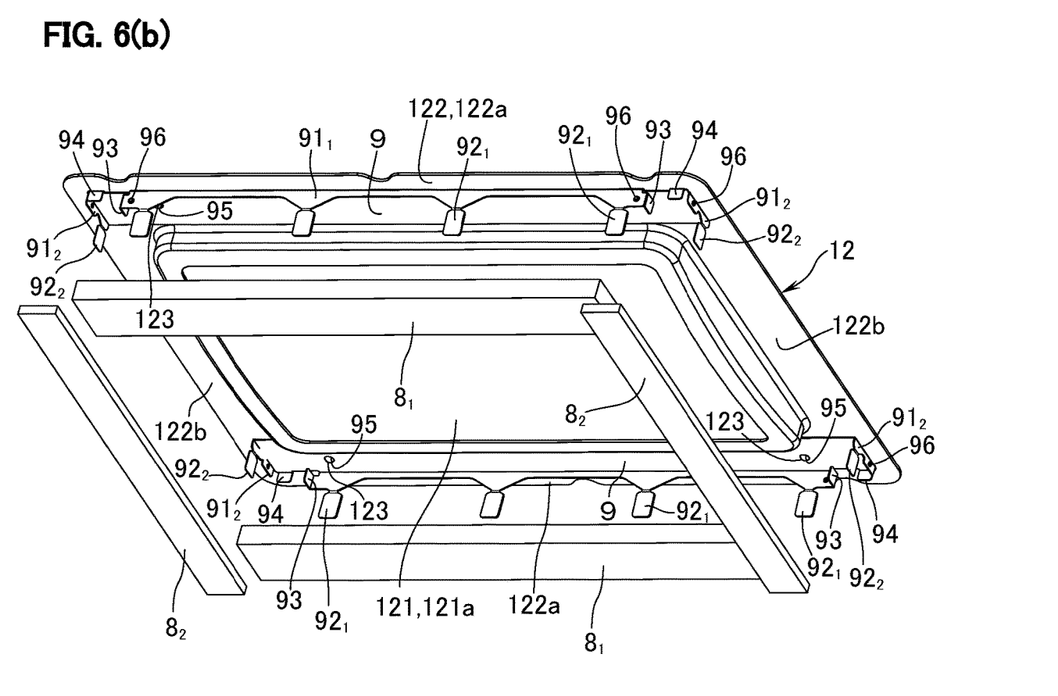

The profile shape of the combustion plate 12 is a laterally elongated rectangle. In this embodiment, as the thermal insulation material, there are provided a first strip thermal insulation material $8_1$ which overlaps that portion 122a of the combustion plate flange part 122 which lies along each of front and rear sides (long sides) of the combustion plate 12; and a second strip thermal insulation material $8_2$ which overlaps that portion 122b of the combustion plate flange part 122 which lies along each of lateral both sides (short sides) of the combustion plate 12. It is also possible to constitute the thermal insulation materials by an integral article like a picture frame which is elongated over an entire circumference of the combustion plate flange part 122. However, according to such an arrangement, it will be necessary to press the thermal insulation material from a blank into the shape of a picture frame. This solution gives rise to the generation of a large amount of scraps, resulting in an increase in the material costs. On the other hand, according to this embodiment, by constituting the thermal insulation materials by the first and the second strip thermal insulation materials $8_1$, $8_2$, as in this embodiment, that part of the raw material which becomes scraps can be reduced, and the material costs can be saved.

In addition, according to this embodiment, in that portion 122a of the combustion plate flange part 122 which lies along each of front and rear sides of the combustion plate 12, there is attached a strip fixing plate 9 which fixes in position the first thermal insulation material $8_1$. On an outside edge of the fixing plate 9, there are provided: a first bent edge part $91_1$ which comes into contact with an outside edge of the first thermal insulation material $8_1$; and a plurality of first tongue-shaped pressing claws $92_1$ which are elongated from the first bent edge part $91_1$ in a manner to press the first thermal insulation material $8_1$ so as not to get released away from the first fixing plate 9. By the way, each of the longitudinal end parts of the first bent edge parts $91_1$ is provided, in a bent manner, with a bent edge part 93 which comes into contact with a longitudinal end surface of the first thermal insulation material $8_1$. Further, each longitudinal end part of the fixing plate 9 is provided with: a second bent edge part $91_2$ which comes into contact with an outside edge on each longitudinal end part of the second thermal insulation material $8_2$; a tongue-shaped second pressing claw $92_2$ which is elongated from the second bent edge parts $91_2$ and which presses each longitudinal end part of the second thermal insulation material $8_2$ so as not to get released away from the fixing plate 9; and a bent part 94 which comes into contact with the longitudinal end surface of the second thermal insulation material $8_2$. Each of the pressing claws $92_1$, $92_2$ is bent, after having set in position each of the first and the second thermal insulation materials $8_1$, $8_2$, thereby pressing each of the thermal insulation materials $8_1$, $8_2$ in position.

It is to be noted that the fixing plate 9 can alternatively be constituted by an integral item like a picture frame extending over an entire circumference of the combustion plate flange part 122. However, this solution requires that the fixing plate be pressed from a raw material into the shape of a picture frame. This solution gives rise to a large amount of scraps, resulting in higher costs for the material. On the other hand, according to this embodiment, by making the fixing plate 9 into a strip and also by omitting the fixing plates for exclusive use by the second thermal insulation material $8_2$, the material costs for the fixing plates 9 can be reduced to the extent possible. Therefore, this embodiment is advantageous in cutting down on costs.

By the way, it is also conceivable to attach the fixing plates for the thermal insulation materials to the water passages $5_1$~$5_4$. According to this arrangement, however, the fixing plates will have to be attached to the water passages $5_1$~$5_4$ by a troublesome work of brazing, resulting in higher costs for attaching the fixing plate. In addition, the thermal insulation materials will be fixed to the combustion box 2 through the fixing plates and the water passages $5_1$~$5_4$. As a result, at the time of assembling the burner 1 to the combustion box 2, positional deviation of the thermal insulation materials relative to the combustion plate flange parts 122 is likely to occur, resulting in fluctuations in the thermal insulation effect.

On the other hand, according to this embodiment, since the fixing plates 9 for the thermal insulation materials are attached to the combustion plate flange parts 122, the positional accuracy of the thermal insulation materials $8_1$, $8_2$ relative to the combustion plate flange parts 122 can be secured. As a result, the thermal insulation effect on the combustion plate flange parts 122 can surely be secured. In addition, the attaching of the fixing plates 9 can be performed by means of spot welding that is remarkably simpler and more convenient than the work of brazing, thus reducing the costs for attaching the fixing plates 9.

Further, according to this embodiment, there is formed a positioning hole 95 in a predetermined position of the fixing plate 9. By causing a projected part 123 formed in the combustion plate flange part 122 to be fitted into the positioning hole 95, the fixing plate 9 is positioned relative to the combustion plate flange part 122. In addition, the bent edge parts $91_1$, $91_2$ are provided with projected parts 96, for positioning, which come into contact with, or lie close to face, the inner wall surface of the combustion box 2. Positioning deviation of the combustion box 2 relative to the combustion plate 12 is thus prevented. It is thus so arranged that the positional accuracy of the electric component 6, attached to the combustion box 2, relative to the combustion plate 12 can be secured.

By the way, since the fixing plate 9 is covered, for the most part thereof, by the thermal insulating materials $8_1$, $8_2$, the fixing plate can be prevented from being overheated. However, since the pressing claws $92_1$, $92_2$ are not covered by the thermal insulating materials $8_1$, $8_2$, there is a possibility of their getting overheated.

As a solution, according to this embodiment, as clearly shown in FIG. 5(a), the uppermost one out of the first water passages $5_1$ disposed on the rear-side side plate 25 of the combustion box 2 is arranged to be in contact with the first pressing claws $92_1$ provided on the fixing plate 9 attached to that portion 122a of the combustion plate flange part 122 which lies along the rear side of the combustion plate 12. Further, the uppermost one out of the third water passages $5_3$ disposed on the front-side side plate 26 of the combustion box 2 is arranged to be in contact with the first pressing claws $92_1$ provided on the fixing plate 9 attached to that portion 122a of the combustion plate flange part 122 which lies along the front side of the combustion plate 12 (see FIG. 4). Still furthermore, the uppermost one out of the second water passages $5_2$ disposed on the laterally one-side side plate of the combustion box 2 is arranged, as shown in FIG. 5(b), to be in contact with second pressing claws $92_2$ provided on an end part of laterally one side of each fixing plate 9. Still furthermore, the fourth water passage $5_4$ disposed on the laterally opposite-side side plate 24 of the combustion box 2 is arranged to be in contact with the second pressing claw $92_2$ provided on an end part of laterally opposite side of each fixing plate 9 (see FIG. 3). According to this arrangement, due to heat dissipation toward each of the water passages $5_1$~$5_4$ that are in contact with each of the pressing claws $92_1$, $92_2$, each of the pressing claws $92_1$, $92_2$ can be prevented from getting overheated.

By the way, on the outer surface on a side of each pressing claw $92_1$, $92_2$, i.e., the upper surface of each of the water passages $5_1$~$5_4$ has a flat surface part. In concrete, a flat surface part is provided on an upper surface of the tube constituting each of the first and the third water passages $5_1$, $5_3$. Further, a flat surface part is provided on an upper surface of the dents $5_2a$, $5_4a$ of each side plate 23, 24 constituting each of the second and fourth water passages $5_2$, $5_4$. And it is so arranged that each of these flat surface parts come into surface contact with each of the pressing claws $92_1$, $92_2$. Therefore, heat dissipation efficiently takes place from each of the pressing claws $92_1$, $92_2$ to each of the water passages $5_1$~$5_4$. Each of the pressing claws $92_1$, $92_2$ can more surely be prevented from getting overheated.

Descriptions have so far been made of the embodiments of this invention with reference to the drawings. This invention shall, however, be not limited to the above. For example, in the above-mentioned embodiment, the combustion box 2 houses therein the heat exchanger 3 for hot water supply. Heat exchangers other than for hot water supply, e.g., for space heating and the like may also be housed in the combustion box 2. Furthermore, in the above-mentioned embodiment, the burner body 11 has formed therein an open surface 111 which faces downward. This invention, however, is also applicable to a combustion apparatus in which the burner is disposed such that the open surface faces upward.

EXPLANATION OF MARKS

| | | | |
|---|---|---|---|
| 1 | burner | 11 | burner body |
| 111 | opening surface | 112 | body flange part |
| 12 | combustion plate | 121 | air-fuel mixture ejection part |
| 122 | combustion plate flange part | 2 | combustion box |
| 22 | connection flange part | 3 | heat exchanger |
| $5_1$~$5_4$ | water passage | 7 | packing |
| $8_1$, $8_2$ | thermal insulation material | | |
| 9 | fixing plate | $92_1$, $92_2$ | pressing claw |

The invention claimed is:

1. A combustion apparatus comprising:
a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body and which contains therein a heat exchanger,
wherein:
in a portion of the combustion box which lies between the burner and the heat exchanger, water passages in series connection with the heat exchanger are disposed as a cooling means for cooling the combustion box;
a packing is further interposed between a combustion plate flange part on a circumference of the combustion plate and the body flange part; and
there is disposed a thermal insulation material overlapping a portion of the combustion plate flange part which faces an inner space of the combustion box,
characterized in:
that a fixing plate for the thermal insulation material is attached to the combustion plate flange part;
that the fixing plate is provided with pressing claws for pressing in position the thermal insulation material so as to press and prevent the thermal insulation material from getting released away from the fixing plate; and
that the water passages are disposed into contact with the pressing claws.

2. The combustion apparatus according to claim 1, wherein outside surfaces of the water passages which are on a side of the pressing claws have flat surface parts, and wherein the flat surface parts are in surface-contact with the pressing claws.

* * * * *